US012565040B2

(12) United States Patent
Shimotsusa

(10) Patent No.: US 12,565,040 B2
(45) Date of Patent: Mar. 3, 2026

(54) HEAD SUBSTRATE, LIQUID DISCHARGING HEAD, AND LIQUID DISCHARGING DEVICE

(71) Applicant: CANON KABUSHIKI KAISHA, Tokyo (JP)

(72) Inventor: Mineo Shimotsusa, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 157 days.

(21) Appl. No.: 18/392,109

(22) Filed: Dec. 21, 2023

(65) Prior Publication Data

US 2024/0208209 A1 Jun. 27, 2024

(30) Foreign Application Priority Data

Dec. 27, 2022 (JP) ................................ 2022-210200

(51) Int. Cl.
*B41J 2/045* (2006.01)
*B41J 2/14* (2006.01)

(52) U.S. Cl.
CPC ......... *B41J 2/04563* (2013.01); *B41J 2/0454* (2013.01); *B41J 2/14129* (2013.01); *B41J 2/14153* (2013.01); *B41J 2/04548* (2013.01); *B41J 2/1404* (2013.01)

(58) Field of Classification Search
CPC .. B41J 2/04563; B41J 2/0454; B41J 2/14129; B41J 2/14153; B41J 2/04548; B41J 2/1404
See application file for complete search history.

(56) References Cited

U.S. PATENT DOCUMENTS 9,033,442 B2 5/2015 Kanno et al.
10,493,774 B2 * 12/2019 Kanno .................. B41J 2/1646
2012/0306953 A1 12/2012 Kanno et al.

FOREIGN PATENT DOCUMENTS

JP 2012-250511 A 12/2012

* cited by examiner

*Primary Examiner* — Geoffrey S Mruk
(74) *Attorney, Agent, or Firm* — VENABLE LLP

(57) ABSTRACT

A head substrate provided on a liquid discharging head, comprising an electrothermal conversion element configured to generate heat for causing liquid to be discharged, one or more first switch elements configured to drive the electrothermal conversion element, a temperature detection element configured to detect a temperature of the electrothermal conversion element, and one or more second switch elements configured to control the temperature detection element, wherein a well layer that forms the first switch elements and a well layer that forms the second switch elements are electrically isolated by a deep element isolation portion formed to be deeper than the well layers.

13 Claims, 13 Drawing Sheets

HEAD SUBSTRATE, LIQUID DISCHARGING HEAD, AND LIQUID DISCHARGING DEVICE

BACKGROUND OF THE INVENTION

Field of the Invention

The present invention relates mainly to a head substrate that is mounted on a printing device.

Description of the Related Art

Some liquid discharging devices and printing devices, which are typified by inkjet printers and the like, detect heat that electrothermal conversion elements have generated to cause liquid, such as ink, to be discharged and determine the state of liquid discharge based on the result (refer to Japanese Patent Laid-Open No. 2012-250511)

A relatively large current may be supplied to the electrothermal conversion elements to heat the liquid, and thus, fluctuations in power supply voltage may occur as noise. To realize the aforementioned temperature-detection-based determination with high accuracy, it is necessary to reduce or suppress the effect of such noise. Generally, it is advantageous to realize such reduction or suppression of the effect of noise with a relatively simple configuration, and in this regard, there is room for improvement in the configuration of Japanese Patent Laid-Open No. 2012-250511.

SUMMARY OF THE INVENTION

The present invention provides a technique that is advantageous for realizing temperature detection and evaluation based thereon for an electrothermal conversion element with high accuracy.

One of the aspects of the present invention provides a head substrate provided on a liquid discharging head, comprising an electrothermal conversion element configured to generate heat for causing liquid to be discharged, one or more first switch elements configured to drive the electrothermal conversion element, a temperature detection element configured to detect a temperature of the electrothermal conversion element, and one or more second switch elements configured to control the temperature detection element, wherein a well layer that forms the first switch elements and a well layer that forms the second switch elements are electrically isolated by a deep element isolation portion formed to be deeper than the well layers.

Further features of the present invention will become apparent from the following description of exemplary embodiments (with reference to the attached drawings).

DESCRIPTION OF THE EMBODIMENTS

Figure 1:
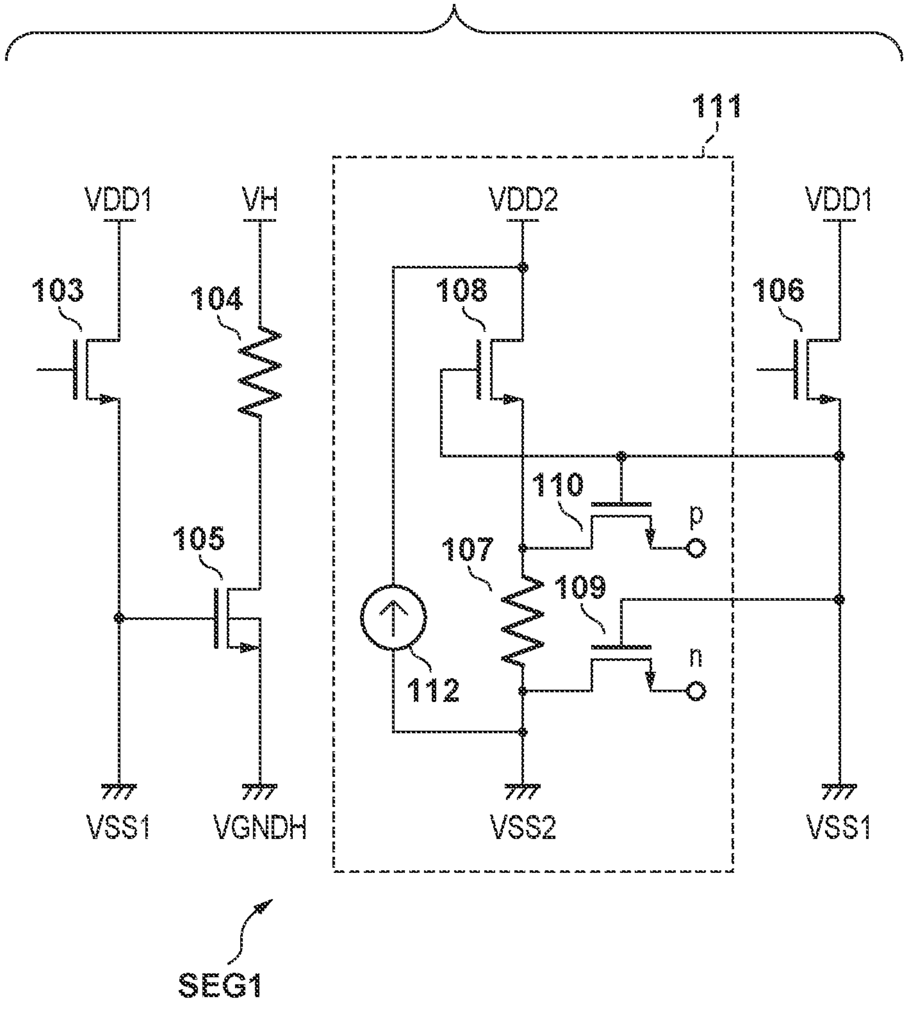
FIG. 1 is a diagram illustrating an example of an equivalent circuit of a unit segment in a liquid discharging head.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(Overall Configuration)

Figure 12:
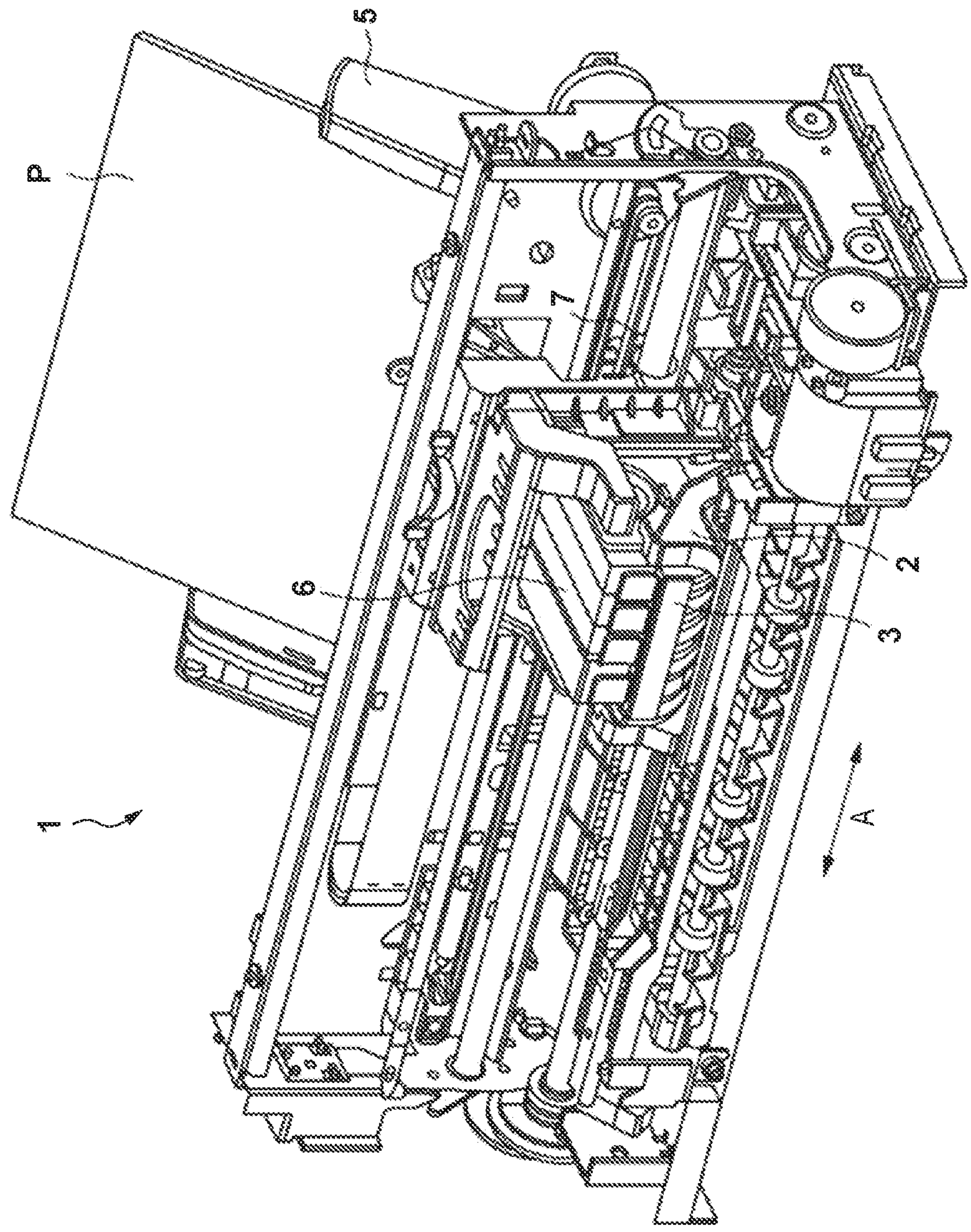
FIG. 12 is a perspective view illustrating an example of an appearance of a liquid discharging device.

FIG. 12 is a perspective view illustrating an example of an appearance of a liquid discharging device 1. The liquid discharging device 1 may be configured to be capable of realizing desired printing by discharging liquid, such as ink, onto a predetermined printing medium P. The liquid discharging device 1 includes a carriage 2 on which a liquid discharging head 3 can be mounted. The printing medium P is fed into the main body of the device by a feeding mechanism 5 and conveyed to a position at which printing is performed by the liquid discharging head 3. The liquid discharging head 3 is caused to perform printing while scanning the printing medium P, which is being conveyed, by the carriage 2 moving back and forth in the directions of arrows A. The liquid discharging device 1 may also be expressed as a printing device, and the liquid discharging head 3 may also be expressed as a printhead.

Further, a plurality of cartridges 6, which store liquids whose types are different from each other, are each mounted on the carriage 2 in an attachable and detachable manner, and the liquids may be supplied to the liquid discharging head 3. For example, if the liquid discharging device 1 is a printing device that supports color printing, ink, such as yellow (Y), magenta (M), cyan (C), and black (K), may be stored in the plurality of cartridges 6.

The liquid discharging head 3 is provided with a plurality of discharging ports for discharging liquid, and the liquid can be discharged individually from the plurality of discharging ports by the liquid being caused to bubble in the liquid discharging head 3 by heat being applied. Typically, in such inkjet printing, electrothermal conversion elements that are capable of realizing heating of liquid may be used as liquid discharging elements.

First Embodiment

FIG. 1 illustrates an example of an equivalent circuit of a unit segment SEG1 in the liquid discharging head 3. The unit segment SEG1 here is assumed to be a component that corresponds to one discharging port. The liquid discharging head 3 includes an electrothermal conversion element 104, a temperature detection element 107, a plurality of switch elements 103, 105, 106, 108, 109 and 110 for driving or controlling those elements, and a constant current source 112. It is assumed that metal oxide semiconductor (MOS) transistors are used for the switch element 103 and the like; however, other known transistors may be used.

The electrothermal conversion element 104 is a resistive element that generates heat upon supply of power and may be expressed as a heater element or simply a heater. The switch elements 103 and 105 are provided in a manner in which they can drive or control the electrothermal conversion element 104. The switch element 103 is disposed between a power supply voltage VDD1 and a ground voltage VSS1, and the switch element 105 is disposed in direct connection with the electrothermal conversion element 104 and between a power supply voltage VH and a ground voltage VGNDH. The switch element 105 enters a conducting state according to the switch element 103 and supplies power to the electrothermal conversion element 104.

The electrothermal conversion element 104 can be thus driven, and when the electrothermal conversion element 104 is driven, liquid, such as ink, is discharged from a corresponding discharging port 113 (see FIGS. 2A and 2B) of the liquid discharging head 3 based on thermal energy thus generated. The switch element 103 may be expressed as a driving target selection element 103, a selection element 103, and the like, and the switch element 105 may be expressed as a driving element 105, a power supply element 105, and the like.

The temperature detection element 107 is a resistive element that is provided in close proximity to the electrothermal conversion element 104 and is assumed to be capable of outputting, as a temperature detection result, a potential difference, which may fluctuate based on the amount of heat generated by the electrothermal conversion element 104. The switch elements 106, 108, 109, and 110 are provided in a manner in which they can drive or control the temperature detection element 107. The switch element 106 is disposed between the power supply voltage VDD1 and the ground voltage VSS1, and the switch element 108 is disposed in direct connection with the temperature detection element 107 and between a power supply VDD2 and a ground voltage VSS2. The switch element 108 enters a conducting state according to the switch element 106 and supplies constant current to the temperature detection element 107. The switch elements 109 and 110 are connected respectively to one end and the other end of the temperature detection element 107.

The temperature detection element 107 can thus be controlled, and a potential difference that occurs in the temperature detection element 107 is read out as a temperature detection result via the switch elements 109 and 110. The switch element 106 may be expressed as a temperature detection selection element 106. The switch element 108 may be expressed as a current supply element 108. The switch elements 109 and 110 may be expressed respectively as a first readout switch 109 and a second readout switch 110 or may be expressed collectively as a readout unit. The switch elements 108, 109 and 110 function as a switch circuit unit for controlling the temperature detection element 107, and a configuration by which temperature detection can be realized with high accuracy is necessary for the circuit unit.

The aforementioned power supply voltage VDD1 and the like need only be set to values at which the liquid discharging head 3 can be appropriately driven. For example, the power supply voltages VDD1 and VDD2 may be set to 1.8 V (volts), 3.3 V, 5 V or the like, the power supply voltage VH may be set to 30 V or the like, and the ground voltages VSS1, VSS2, and VGHDH, may be set to 0 V or the like.

In the present example, the power supply voltages VDD1 and VDD2 are often at the same voltages but isolated from each other, and similarly, the ground voltages VSS1 and VSS2 are isolated from each other (power supply isolation). This makes it possible to reduce or suppress electrical interference between the switch circuit unit for controlling the temperature detection element 107 (here, a circuit that includes the switch elements 108, 109 and 110) and other circuit units.

It is similar for the power supply voltage VH and the ground voltage VGHDH.

Figure 2A:
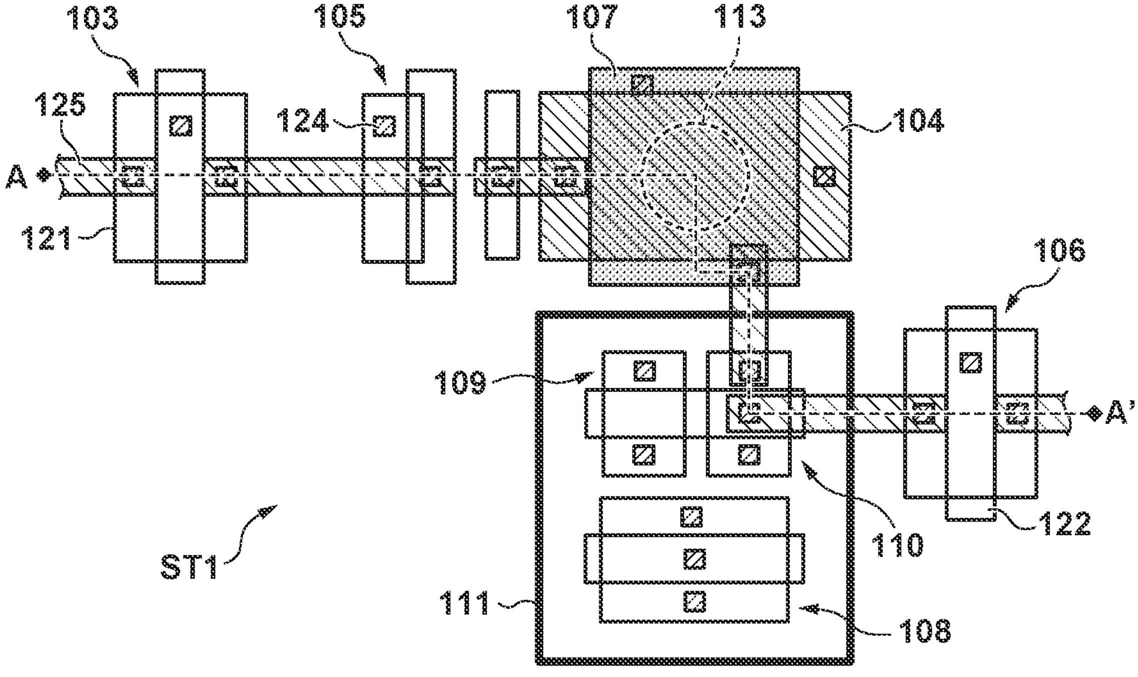
FIGS. 2A and 2B are diagrams illustrating examples of a structure that corresponds to the circuit diagram of the unit segment.
Figure 2B:
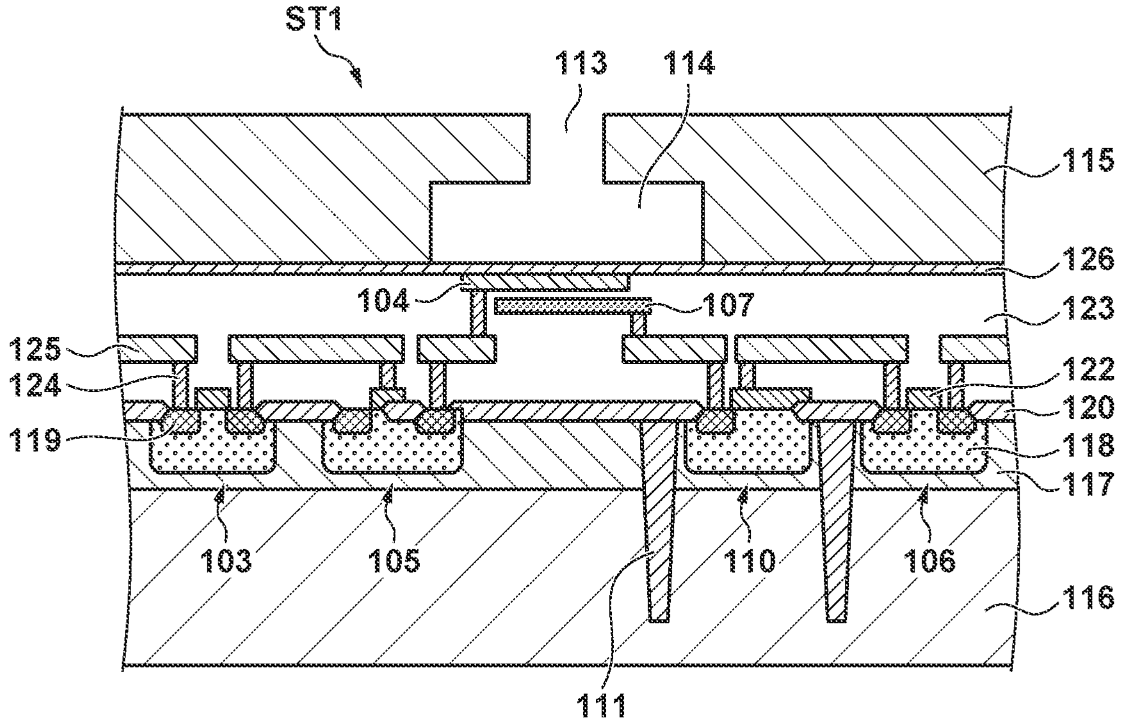

FIG. 2A illustrates an example of a plan-view layout of a structure ST1, which corresponds to the circuit diagram of the unit segment SEG1 of FIG. 1, and FIG. 2B illustrates an example of a cross-sectional view across a cutting line A-A'. Generally, the structure ST1 may be constructed by forming, on a silicon substrate 116, each of a plurality of n-type/p-type impurity regions, a metal layer for electrically connecting those regions, and an insulation layer for electrical isolation between the layers. The structure ST1 can be manufactured using known semiconductor manufacturing techniques. In addition, here, as a stereotypical example, it is assumed that silicon is used as the semiconductor material; however, other known materials, such as gallium arsenide, may be used.

In the present embodiment, the substrate 116 is assumed to be a p-type (first conductivity type) silicon substrate. In the substrate 116, a well layer 117 is formed as an n-type (second conductivity type) impurity region. The well layer 117 can be formed by, for example, an epitaxial growth method, an ion implantation method, or the like, and the depth thereof (depth from the surface of the substrate 116) is assumed to be about 2 to 5 μm.

In the substrate 116, a well layer 118 is further formed as a p-type impurity region. The well layer 118 can be formed by the ion implantation method or the like, and the depth thereof is assumed to be about 1 to 5 μm. The well layer 118 may formed to be shallower than or deeper than the well layer 117.

In the well layer 118, n-type diffusion regions are formed as sources/drains 119 of n-channel-type MOS transistors, which are the above-described switch elements. The sources/drains 119 can be formed by the ion implantation method or the like. Although not illustrated here, p-type diffusion regions may also be formed in the well layer 117 as the sources/drains of p-channel-type MOS transistors. Further, gates 122 of individual MOS transistors are formed of polysilicon or the like on the substrate 116, interposing a gate insulation film.

An element isolation portion 120 (shallow element isolation portion 120 is assumed for distinction from a deep element isolation portion 111, which will be described later) may be formed between the elements (here, MOS transistors) thus formed on the substrate 116.

The shallow element isolation portion 120 is constituted by an insulation member, such as a silicon oxide, and can be formed of LOCOS. ST1, or the like, and the depth thereof is 300 nm or less. A line 121 illustrated in FIG. 2A indicates a boundary of an active region that is defined by the shallow element isolation portion 120.

An insulation member 123 is disposed as an insulation layer that is disposed on the substrate 116, and connection lines 124 and wiring 125 are disposed therebetween as a metal layer. The connection lines 124 may be formed of, for example, tungsten, copper, or the like, and the wiring 125 may be formed of, for example, aluminum, copper, or the like; these may be formed to be a plurality of layers as necessary.

Further, the electrothermal conversion element 104 and the temperature detection element 107 are disposed in close proximity to each other in the insulation member 123, and the electrothermal conversion element 104 is disposed above the temperature detection element 107. The electrothermal conversion element 104 may be constituted by, for example, TaSiN, WSiN, or the like. The temperature detection element 107 may be constituted by, for example, TaSiN, TiN, or the like. The discharging port 113 and a bubbling chamber 114 may be formed by a nozzle material 115 above the electrothermal conversion element 104, interposing a protective film 126. Although not illustrated, a cavitation-resistant film may be further disposed on the protective film 126.

As illustrated in FIGS. 1 and 2, the deep element isolation portion 111 may be formed around the switch elements 108, 109 and 110. The deep element isolation portion 111 may be formed of an insulation member, such as silicon oxide, silicon nitride, or the like. The deep element isolation portion 111 may be formed to be at least deeper than the well layers 117 and 118, and the depth thereof is assumed to be about 3 to 10 μm. The width of the deep element isolation portion 111 is assumed to be about 0.5 to 2 μm. The aspect ratio of the width and depth of the deep element isolation portion 111 is typically about 1:5.

The deep element isolation portion 111 need only to be able to realize electrical isolation (reduction or suppression of electrical interference) between the elements more efficiently than the shallow element isolation portion 120 and may be configured to be of another form. For example, the deep element isolation portion 111 may be formed of a groove-like cavity or may be a structure that has been covered by an insulation member and filled with polysilicon or the like therein.

According to the structure ST1, the switch elements 108, 109 and 110 are electrically isolated by the deep element isolation portion 111. This makes it possible to electrically isolate the power supply voltage VDD2 and the ground voltage VSS2, to which the switch elements 108, 109 and 110 and the temperature detection element 107 are connected, from another power supply voltage or ground voltage in an appropriate manner.

According to the present embodiment, the power supply voltage VDD1 and the like are electrically separated from each other not only by the well layer 117 and the like but also by the deep element isolation portion 111.

The switch circuit unit for controlling the temperature detection element 107 (here, the circuit that includes switch elements 108, 109, and 110) operates based on the power supply voltage VDD2 and the ground voltage VSS2, and the switch circuit unit is less susceptible to electrical interference from the other circuit units that operate based on another power supply voltage or ground voltage. This makes it possible to appropriately reduce the effect of noise for the switch circuit unit (noise that may occur in other circuit units, mainly noise that may occur due to driving of the electrothermal conversion element 104).

Therefore, according to the present embodiment, it is possible for the temperature detection element 107 to detect the heat that has been generated by the electrothermal conversion element 104 with high accuracy, and it is possible to realize subsequent signal processing or determination that is based on that result with high accuracy.

Second Embodiment

Figure 3:
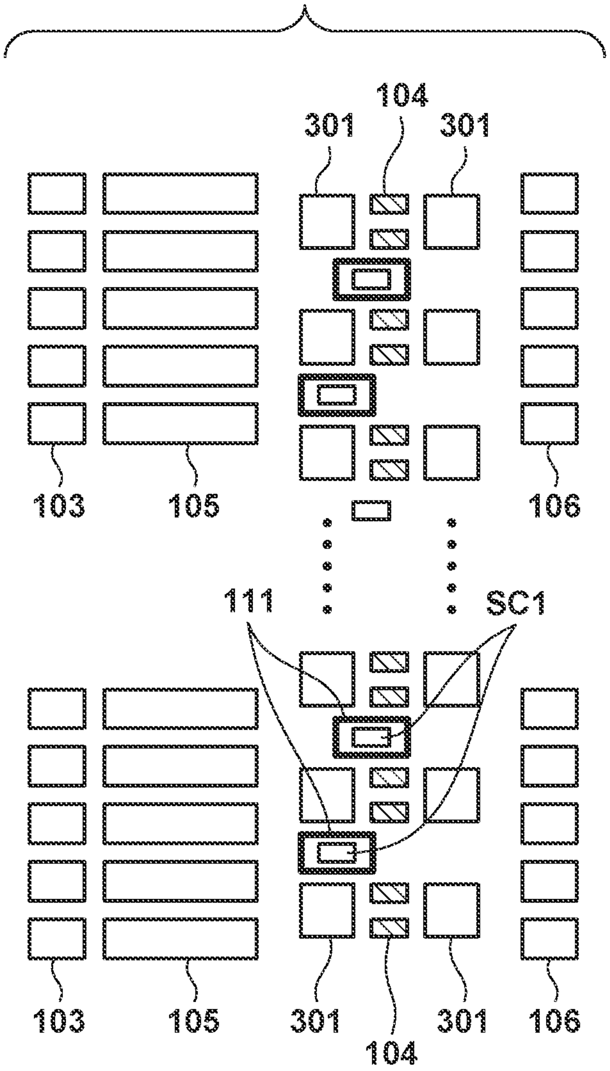
FIG. 3 is a diagram illustrating an example of a form in which a plurality of segments are arranged.
Figure 4A:
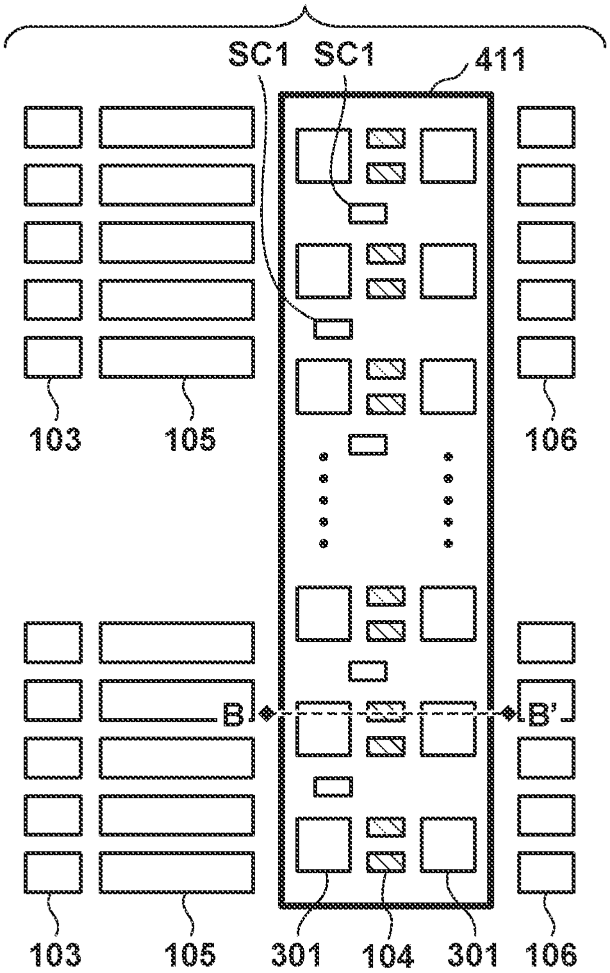
FIGS. 4A and 4B are diagrams illustrating examples of a form in which a plurality of segments are arranged.
Figure 4B:
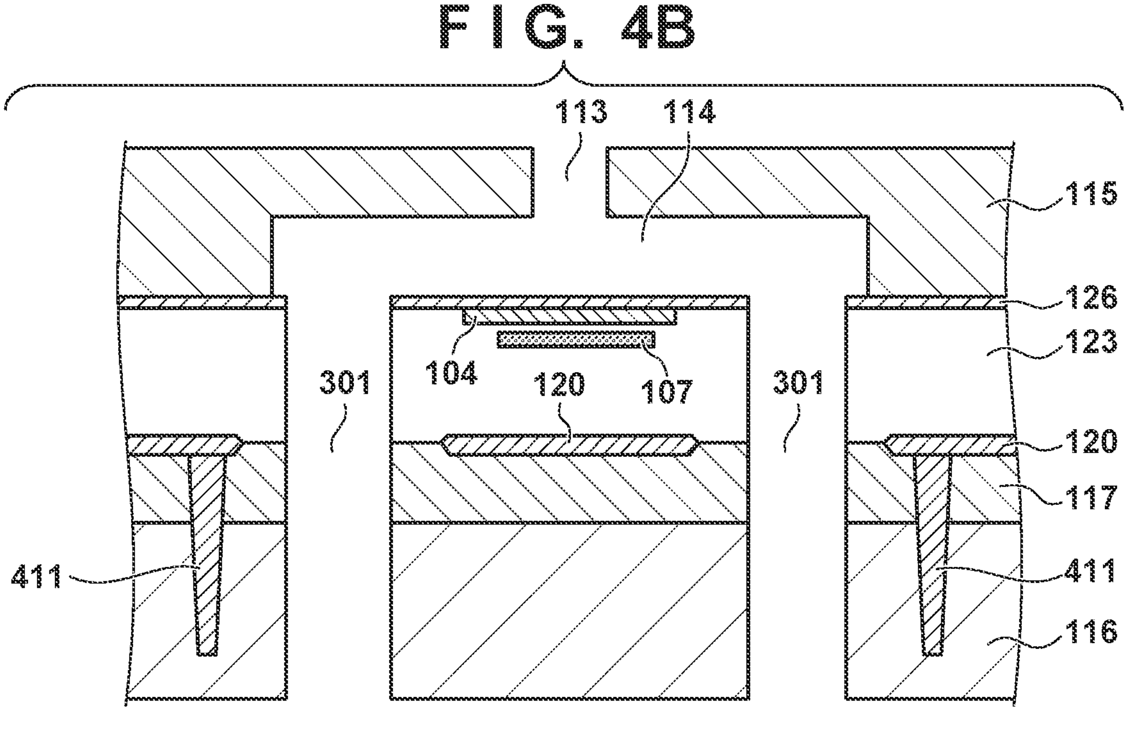

FIG. 4A is a schematic plan view illustrating an example of a configuration in which a plurality of segments SEG1 are arranged, and FIG. 4B illustrates a cross-sectional structure across a cutting line B-B'. FIG. 3 is a schematic plan view illustrating a reference example of a form in which a plurality of segments SEG1 is arranged.

As illustrated in FIGS. 3 and 4A, a plurality of electrothermal conversion elements 104 are arranged in one direction, and supply ports 301 for liquid supply are arranged in pairs so as to be positioned on either side of the elements. A pair of supply ports 301 may be formed to merge in the bubbling chamber 114, extending through the silicon substrate 116, the well layer 117, the insulation member 123 and the protective film 126, as illustrated in FIG. 4B. The switch elements 103 and 105 may be arranged on one side of the pair of supply ports 301, and the switch element 106 may be arranged on the other side.

Here, in the example of FIG. 3, the deep element isolation portion 111 is arranged individually for a plurality of switch circuit units SC1 (i.e., provided for each segment SEG1) so as to surround each switch circuit unit SC1, which includes the switch elements 108, 109, and 110, in a plan view.

In contrast, in the example of FIG. 4, a deep element isolation portion 411 is provided so as to surround not only the plurality of switch circuit units SC1 but also the plurality of electrothermal conversion elements 104 and the plurality of supply ports 301. The aforementioned effect of noise on the switch circuit unit SC1 for controlling the temperature detection element 107 need only be reduced; thus, in the present example, the deep element isolation portion 411 need not be provided for each segment SEG1, and it can be said to be advantageous from the viewpoint of large-scale integration compared to the example of FIG. 3.

Therefore, according to the present embodiment, it not only is possible to reduce the effect of noise on the switch circuit unit SC1 for controlling the temperature detection element 107 as in the first embodiment but it may also be advantageous from the viewpoint of large-scale integration.

Third Embodiment

Figure 6:
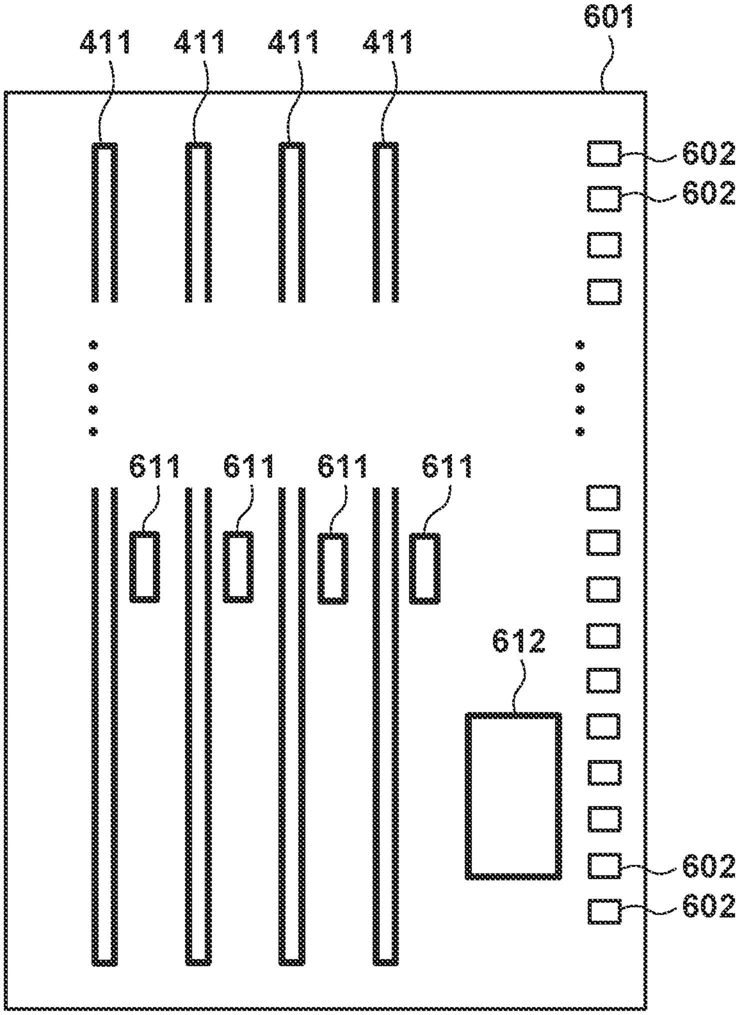
FIG. 6 is a schematic plan view illustrating an example of the head substrate of the liquid discharging head.

FIG. 6 is a schematic plan view illustrating an example of a head substrate 601 that forms a functional portion of a liquid discharging head 101 according to a third embodiment. Electrode pads 602, which are electrically connected to external devices, such as a control board and a power supply IC, may be arranged on a side or edge portion of the head substrate 601.

Figure 5A:
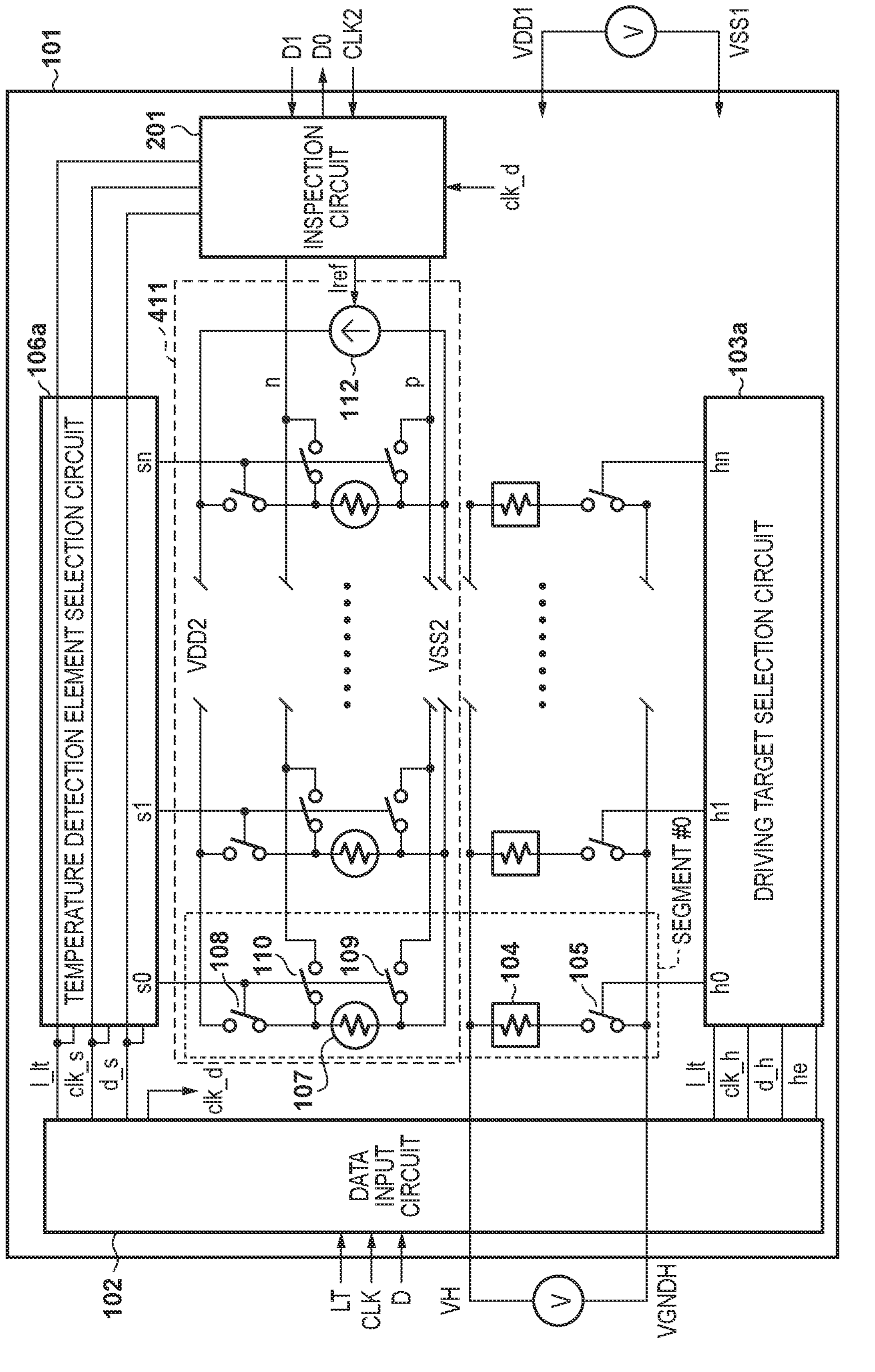
FIGS. 5A to 5C are diagrams illustrating examples of a circuit configuration of a head substrate of the liquid discharging head.
Figure 5B:
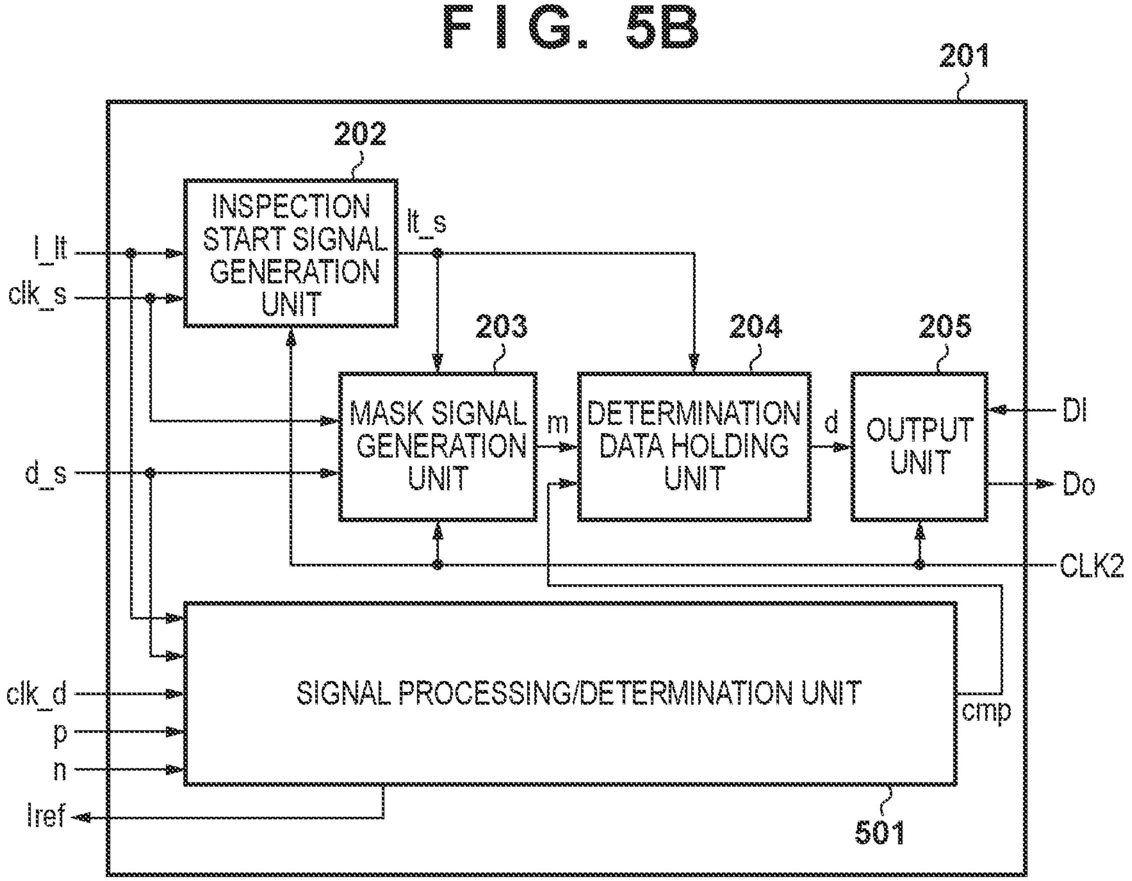
Figure 5C:
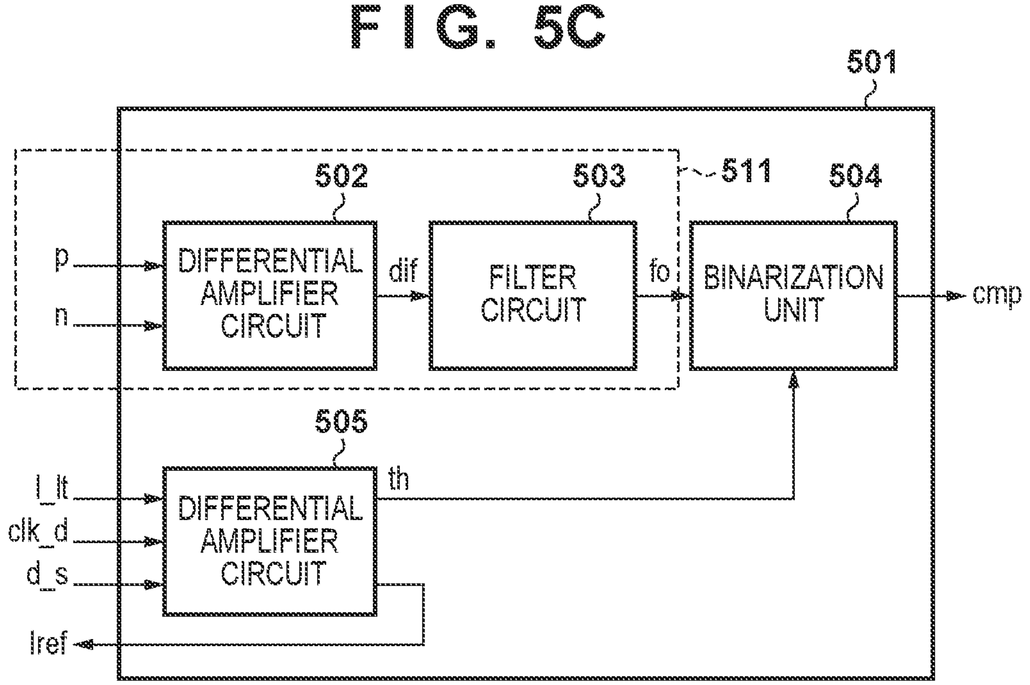

FIG. 5A illustrates an example of a circuit configuration of the liquid discharging head 101 according to the third embodiment. The liquid discharging head 101 includes not only each component of the aforementioned segment SEG1 but also a data input circuit 102, a driving target selection circuit 103*a*, a temperature detection element selection circuit 106*a*, and an inspection circuit 201. FIG. 5B illustrates an example of a configuration of the inspection circuit 201. The inspection circuit 201 includes an inspection start signal generation unit 202, a mask signal generation unit 203, a determination data holding unit 204, an output unit 205, and a signal processing/determination unit 501. FIG. 5C illustrates an example of a configuration of the signal processing/determination unit 501. The signal processing/determination unit 501 includes a differential amplifier circuit 502, a filter circuit 503, a binarization unit 504, and an adjustment unit 505.

As illustrated in FIG. 5A, a plurality of electrothermal conversion elements 104 are arranged in a predetermined direction, and a plurality of temperature detection elements 107, switch elements 105, and the like are arranged correspondingly. Here, for the sake of descriptive simplicity, one column of the electrothermal conversion element 104 is illustrated; however, there may be two or more columns.

In the drawing, the elements that are surrounded in a broken line correspond to segment #0, and one temperature detection element 107 is arranged in a manner in which it corresponds to one electrothermal conversion element 104. Similarly, other segments #1 to #n are arranged so as to be aligned with segment #0. In each segment, a result of temperature detection by the temperature detection element 107 indicates a change in temperature of a corresponding electrothermal conversion element 104, and it is possible to determine, based on the change in temperature, the state of liquid discharge, which is caused by the corresponding electrothermal conversion element 104 being driven.

The data input circuit 102 receives a latch signal LT, a clock signal CLK, and a data signal D from external devices. Based on these, the data input circuit 102 generates various control signals l_lt, clk_h, d_h, he, clk_s, d_s, and clk_d.

The data input circuit 102 includes, for example, a shift register and a latch circuit and is capable of reading the data signal D, which has been received from an external device, into the shift register while periodically transferring the data signal D and outputting a group of read signals at a predetermined timing. The data input circuit 102 thus outputs, for example, the latch signal l_lt, the clock signal clk_h, the data signal d_h, and the heat enable signal he to the driving target selection circuit 103*a*. Similarly, the data input circuit 102 outputs, for example, the latch signal l_lt, and the clock signal clk_s and the data signal d_s to the temperature detection element selection circuit 106*a* and the inspection circuit 201 and outputs the clock signal clk_d to the inspection circuit 201.

The latch signal l_lt may be generated with a pulse shape of a predetermined width at a timing of a falling edge of the latch signal LT. The clock signals clk_h, clk_s and clk_d may be generated as reference signals for transfer. The data signal d_h may be generated to select the electrothermal conversion element 104 to be driven, and the heat enable signal he may be used to drive the electrothermal conversion element 104 that has been selected to be driven. The data signal d_s may be generated to select the temperature detection element 107 to be controlled.

The driving target selection circuit 103*a* includes a shift register and a decoder and demodulates signals that has been received from the data input circuit 102 and selectively drives a plurality of electrothermal conversion elements 104 as will be described later. Similarly, the temperature detection element selection circuit 106*a* selectively controls a plurality of temperature detection elements 107.

The driving target selection circuit 103*a* can selectively drive the plurality of electrothermal conversion elements 104 based on the latch signal l_lt, the clock signal clk_h, the data signal d_h, and the heat enable signal he, which have been received from the data input circuit 102. The driving target selection circuit 103*a* includes, for example, a shift register and a decoder, and can individually drive the plurality of electrothermal conversion elements 104 according to a so-called time-division method. That is, the plurality of electrothermal conversion elements 104 are divided into a number of groups, each including two or more electrothermal conversion elements 104; the two or more electrothermal conversion elements 104 of those groups are driven in order in block units, approximately at the same time. Such groups may be expressed as time-division groups, and the electrothermal conversion elements 104 between different groups that are to be driven approximately at the same time may be expressed as a time-division block.

For example, the electrothermal conversion elements 104 that correspond to segments #0, #8, and #16 may allocated to block #0, and the electrothermal conversion elements 104 that correspond to segments #1, #9, and #17 may allocated to block #1. In this case, block #0 (i.e., the electrothermal conversion elements 104 of segments #0, #8, and #16) may be driven first, block #1 (i.e., the electrothermal conversion elements 104 of segment #1, #9, and #17) may be driven next, and block #3 and onward may be driven according to a similar procedure. A duration for driving one block once may be expressed as a block period.

Focusing on segment #0 as one example, the electrothermal conversion element 104 is connected to the power supply voltage VH at one end and the driving switch 105 at the other end. The driving switch 105 is connected to the ground voltage VGNDH at a terminal that is opposite from the electrothermal conversion element 104 side. The power supply voltage VH and the ground voltage VGNDH may each be supplied from a corresponding electrode pad 602 (refer to FIG. 6). The driving switch 105 is controlled based on a selection signal h0 from the driving target selection circuit 103*a* and enters a conducting state or a non-conducting state. These configuration and control are similar for other segments, such as segment #1.

According to this configuration, the driving target selection circuit 103*a* causes a specific one of the plurality of driving switches 105 to enter a conducting state based on the data signal d_h and thus drives a corresponding electrothermal conversion element 104. In response to this, liquid is discharged from a discharging port corresponding to the driven electrothermal conversion element 104.

The temperature detection element selection circuit 106*a* is capable of selectively controlling the plurality of temperature detection elements 107 based on the latch signal l_lt, the clock signal clk_s, and the data signal d_s, which have been received from the data input circuit 102. The temperature detection element 107 to be controlled outputs a signal that is based on a potential difference occurring therein to the inspection circuit 201 via the switch elements 109 and 110.

In the present example, each of the plurality of temperature detection elements 107 is connected to common lines p and n via corresponding switch elements 109 and 110. Focusing on segment #0 as one example, the switch elements 109 and 110 are controlled based on a selection signal s0 from the temperature detection element selection circuit 106*a* and enters a conducting state or a non-conducting state. These configuration and control are similar for other segments, such as segment #1.

The inspection circuit 201 is capable of inspecting the state of liquid discharge, which accompanies driving of the electrothermal conversion element 104, by processing, based on the clock signal clk_d, a signal that has been received from temperature detection element 107 and thus determines whether that state of liquid discharge satisfies a criterion.

The amount of time that is required for one example of processing for the aforementioned determination, which is based on a result of inspection by the inspection circuit 201, is two block periods in the present example. In addition, the data signal D not only includes printing information, which is required for realizing printing, but also includes, as identification information, control information on printing and inspection, and the aforementioned determination may be performed based on the identification information.

In the present example, the inspection circuit 201 receives, as temperature information, a signal from temperature detection element 107 via the common lines p and n and outputs a determination result signal Do, which indicates whether the state of liquid discharge satisfies the criterion, based on the waveform of the signal.

Here, in such a configuration, the deep element isolation portion 411 may be provided to surround, in a collective manner, a region in which a plurality of switch elements 108, 109 and 110 are arranged, as illustrated in FIG. 5A.

As illustrated in FIG. 5B, a clock signal CLK2 for deciding a timing at which to output signals of individual elements is further inputted to the inspection circuit 201.

In the inspection circuit 201, the inspection start signal generation unit 202 generates a detection start signal lt_s, which is for determining a timing at which to start temperature detection or measurement, based on the latch signal l_lt and the clock signal clk_s. The mask signal generation unit 203 generates a pulse-shaped mask signal m, which has a predetermined time width, based on the detection start signal lt_s and the clock signal clk_s.

Here, the signal processing/determination unit 501 determines whether the state of liquid discharge satisfies the criterion based on the waveform of a signal that has been received from the temperature detection element 107 via the common lines p and n. If the state of liquid discharge does not satisfy the criterion, the signal processing/determination unit 501 outputs a binary signal cmp to the determination data holding unit 204. The determination data holding unit 204 converts the binary signal cmp to a signal d based on the detection start signal lt_s and the mask signal m and outputs the signal d to the output unit 205. The output unit 205 converts the signal d into the determination result signal Do based on the clock signal CLK2 and outputs the determination result signal Do.

As illustrated in FIG. 5C, in the signal processing/determination unit 501, the differential amplifier circuit 502 amplifies a potential difference of the temperature detection element 107, which has been received via the common lines p and n, and outputs the result as a differential output dif to the filter circuit 503. The filter circuit 503 includes a bandpass filter, performs filter processing (differential processing) on the differential output dif with the bandpass filter, and outputs the result as a filter output fo to the binarization unit 504. The binarization unit 504 includes a comparator, compares the filter output fo and a threshold th, which has been set in advance in the adjustment unit 505, with the comparator, and generates the comparison result as the binary signal cmp. The threshold th need only be set to be a value that will be a criterion for determining whether the state of liquid discharge at a discharging port to be inspected (to be a target of temperature detection) satisfies the criterion.

The adjustment unit 505 may include a DA converter that generates a reference current Iref, which is provided to the constant current source 112, and a DA converter that generates the threshold th, which is provided to the binarization unit 504. These DA converters output corresponding values based on the latch signal l_lt, the clock signal clk_s, and the data signal d_s.

In such a configuration, the differential amplifier circuit 502, which directly processes a signal that is from the temperature detection element 107, and the filter circuit 503 may be surrounded by a deep element isolation portion 511. This makes it possible to reduce the effect of noise for the differential amplifier circuit 502 and the filter circuit 503 and execute processing of a signal that is from the temperature detection element 107 with high accuracy.

In the example of FIG. 6, it is assumed that the plurality of electrothermal conversion elements 104 are arranged so as to form two or more columns (here, four columns). With simplification of circuit configuration as one of the objectives, the differential amplifier circuit 502 may be arranged for each column. In this case, deep element isolation portions 611, which surround the differential amplifier circuits 502, are provided in a manner in which they correspond to the respective deep element isolation portions 411, and four deep element isolation portions 611 may be provided in this example. Meanwhile, the filter circuit 503 may be arranged for every few columns. In this case, a deep element isolation portion 612, which surrounds the filter circuits 503, is provided in a manner in which they correspond to a number of deep element isolation portions 411, and one deep element isolation portion 612 may be provided in this example.

Figure 7:
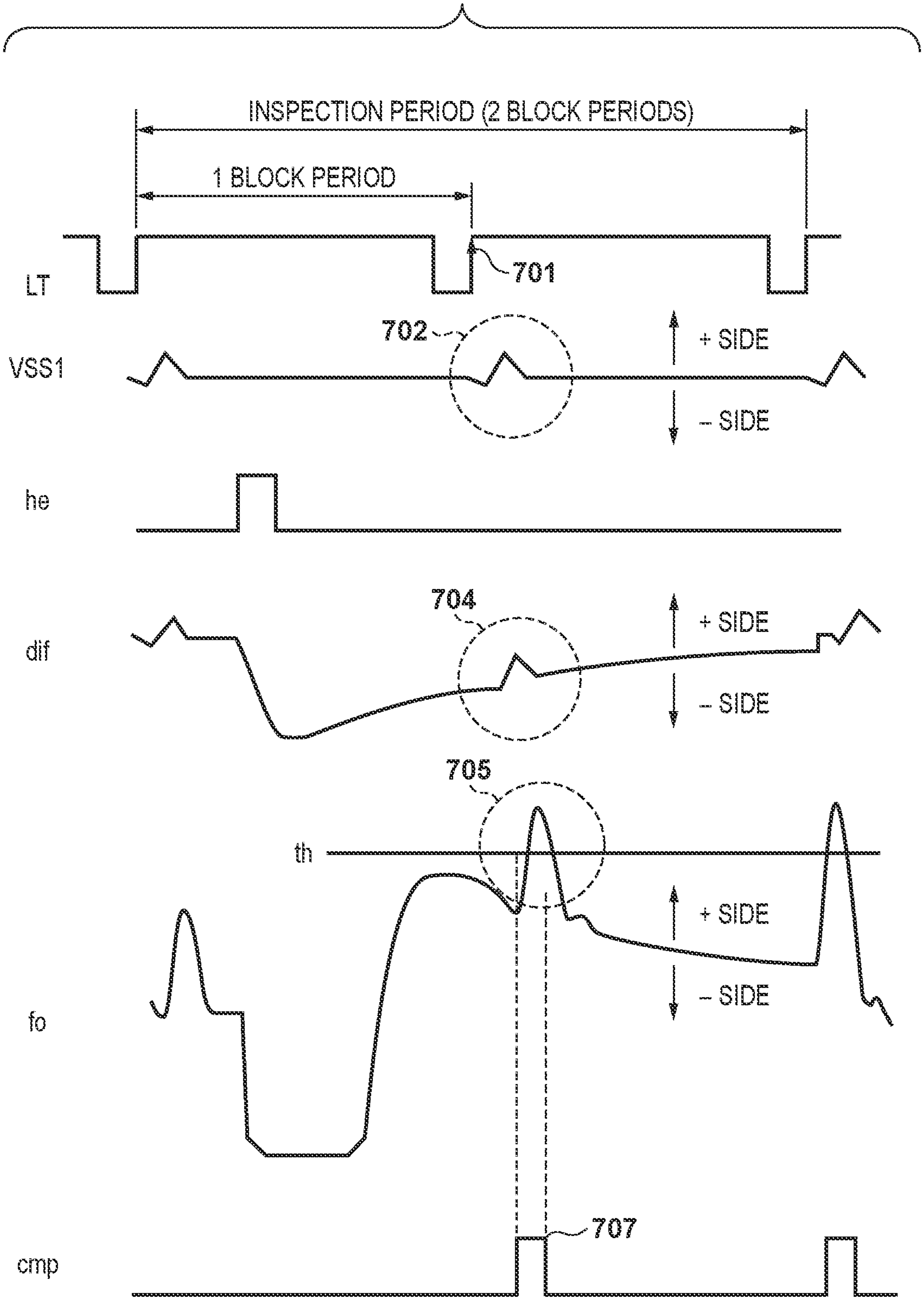
FIG. 7 is a timing chart for explaining a waveform of each signal.

FIG. 7 is a timing chart for explaining waveforms of respective signals as a reference example and, here, illustrates a case where liquid discharge by an inspection target discharging port does not satisfy the criterion.

Figure 8:
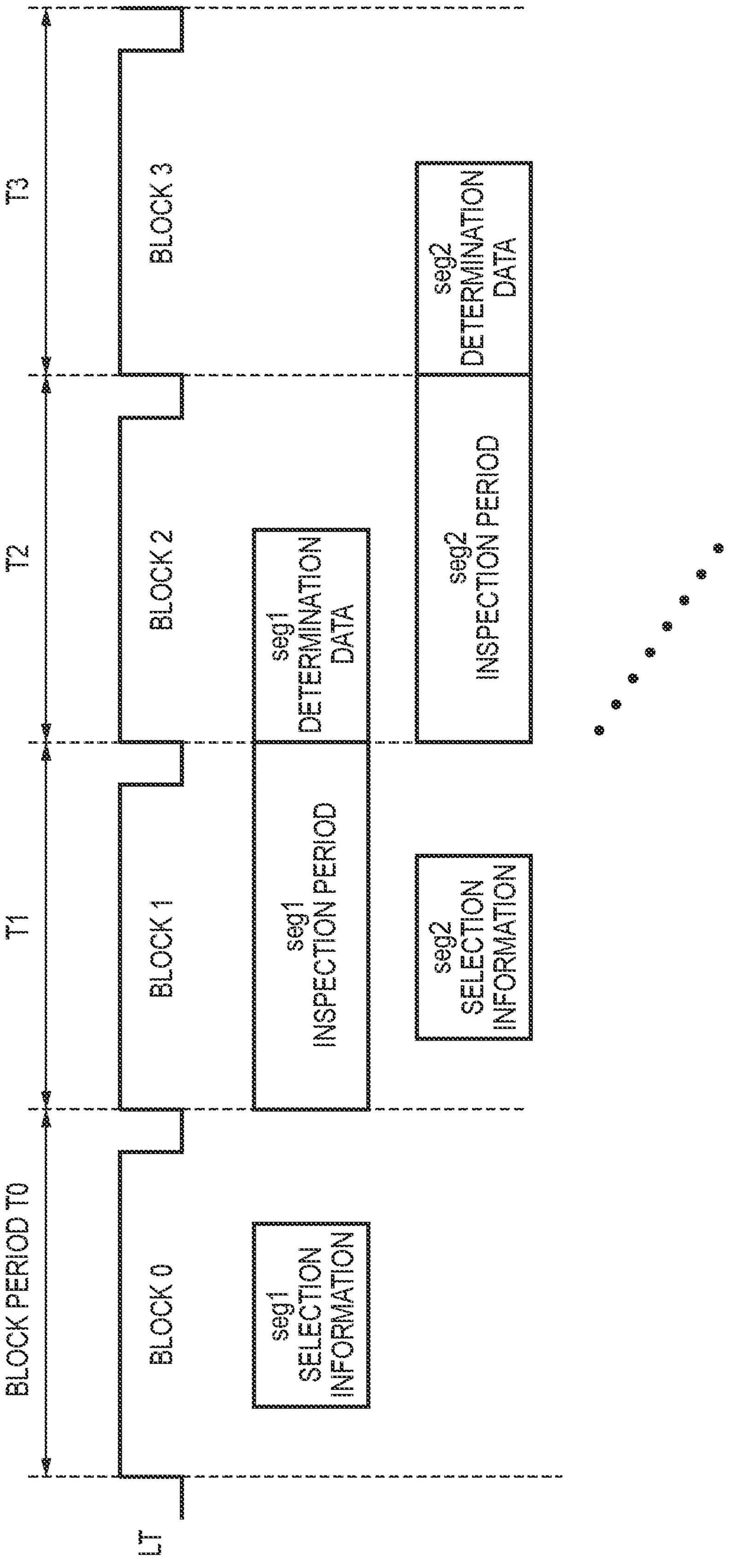
FIG. 8 is a timing chart for explaining an inspection mode.

FIG. 8 illustrates a timing chart for explaining the state of inspection for four block periods. According to this example, in period T0, selection information is inputted for segment #1 (seg1 selection information). In period T1, inspection is performed for segment #1 (seg1 inspection period), and selection information is inputted for segment #2 (seg2 selection information). In period T2, determination data is outputted for segment #1 (seg1 determination data), and inspection is performed for segment #2 (seg2 inspection period). Furthermore, in period T2, although not illustrated here, selection information is inputted for the segment #3 (seg3 selection information). In period T3, determination data is outputted for segment #2 (seg2 determination data), and although not illustrated, inspection is performed for segment #3 (seg3 inspection period). Hereinafter, similar processing is repeated, and a series of inspection steps for the plurality of segments is thus performed in block periods, in order of input of selection information, inspection, and output of determination data.

As illustrated in FIG. 7, at the timing of a rising edge 701 of the latch signal LT, the ground voltage VSS1 fluctuates due to generation of relatively large current in a logic circuit, and thus noise (potential fluctuations) 702 may occur. The noise 702 causes a noise 704 in the differential output dif of the differential amplifier circuit 502, which in turn causes a noise 705 in the filter output fo of the filter circuit 503, and the binary signal cmp may be outputted 707 under such a noise environment.

According to the present embodiment, not only is the switch circuit unit for controlling the temperature detection element 107 (here, the circuit that includes the switch elements 108, 109, and 110) surrounded by the deep element isolation portion 411 but also the differential amplifier circuit 502, which directly processes a signal from the temperature detection element 107, and the filter circuit 503 are surrounded by the deep element isolation portion 511. The aforementioned noises 704 and 705 are thus reduced or controlled, and it is possible to execute processing of a signal from temperature detection element 107 with high accuracy.

Fourth Embodiment

The above-described deep element isolation portion 411 and the like have been illustrated as being formed in the shape of a continuous ring; however, it need only be able to electrically isolate, from other circuit units, a circuit unit to be protected from noise, and changes may be added within a scope that does not depart from that purpose.

Figure 9:
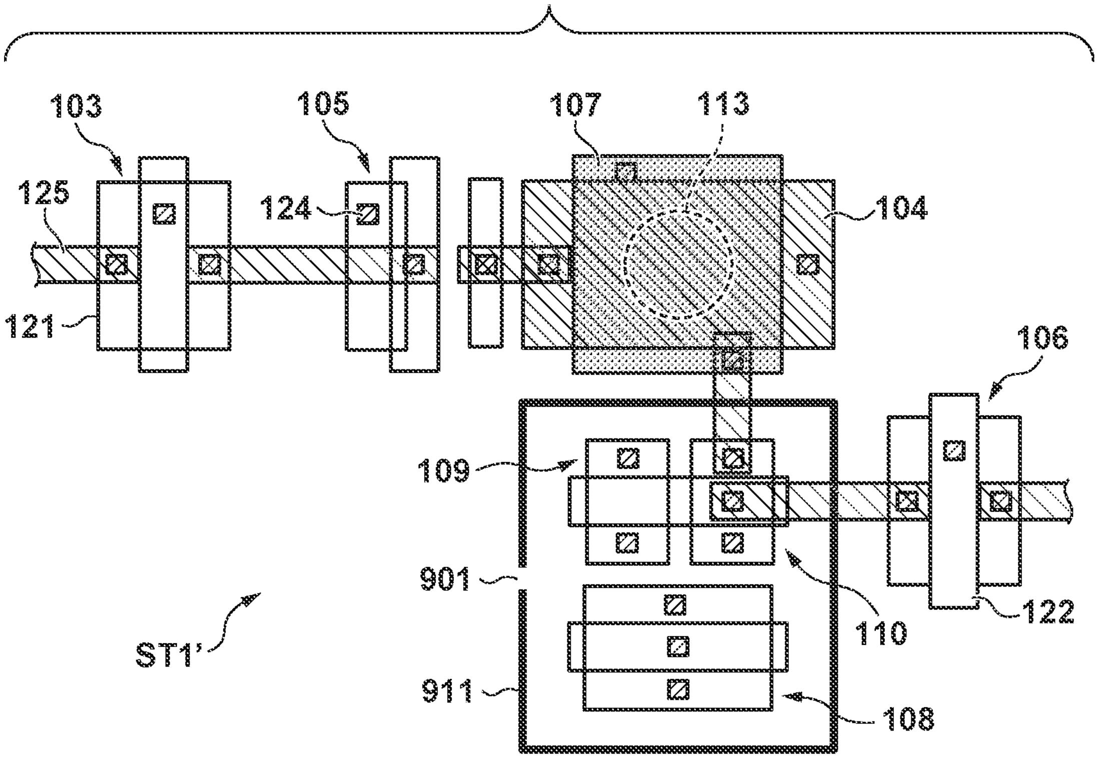
FIG. 9 is a diagram illustrating an example of another structure that corresponds to the circuit diagram of the unit segment.

FIG. 9 illustrates a plan-view layout of another structure ST1', which corresponds to the circuit diagram of the unit segment SEG1 of FIG. 1, similarly to FIG. 2A. As illustrated in FIG. 9, a deep element isolation portion 911, which surrounds the above-described switch circuit unit for controlling the temperature detection element 107, need not be provided so as to completely surround the switch circuit unit and may be partially separated by a separating region 901.

Figure 10:
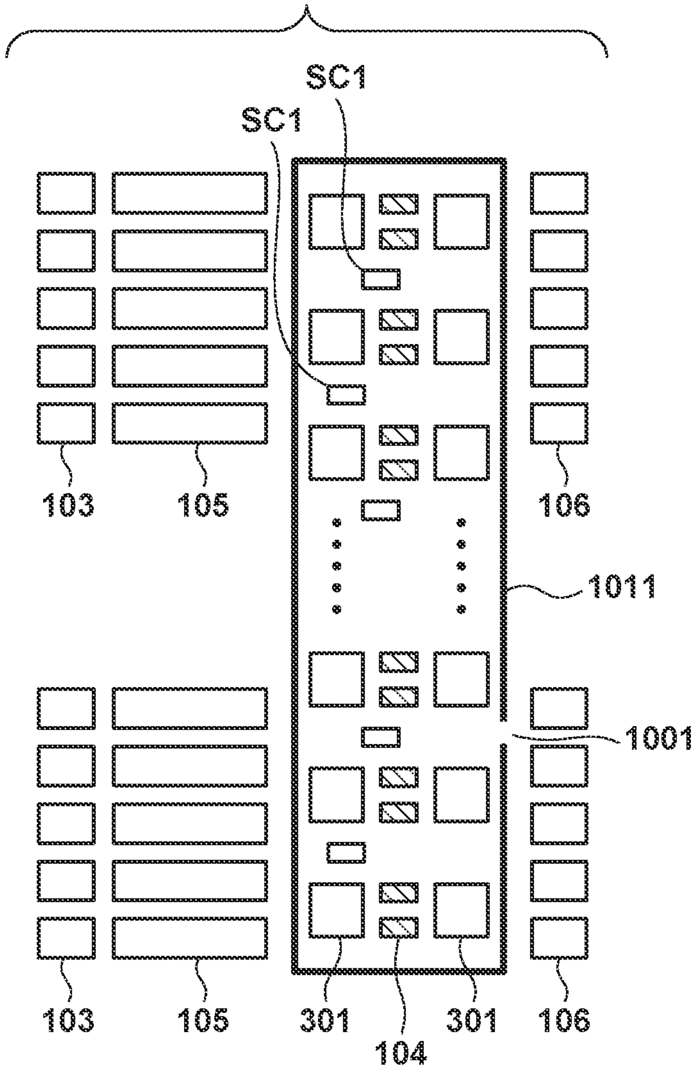
FIG. 10 is a diagram illustrating an example of a form in which a plurality of segments are arranged.

FIG. 10 illustrates another example of a form in which a plurality of segments SEG1 are arranged, similarly to FIG. 4A. In the example of FIG. 10, similarly, a deep element isolation portion 1011, which surrounds a plurality of switch circuit units SC1, a plurality of electrothermal conversion elements 104, and a plurality of supply ports 301, need not be provided so as to completely surround these components and may be partially separated by a separating region 1001.

It is advantageous to position such separating regions 901 and 1001 on a side distal to other circuit units that may generate noise, in a plan view. Although description will be omitted here, it is similar for the deep element isolation portion that surrounds the differential amplifier circuit 502 and the filter circuit 503.

Fifth Embodiment

Figure 11:
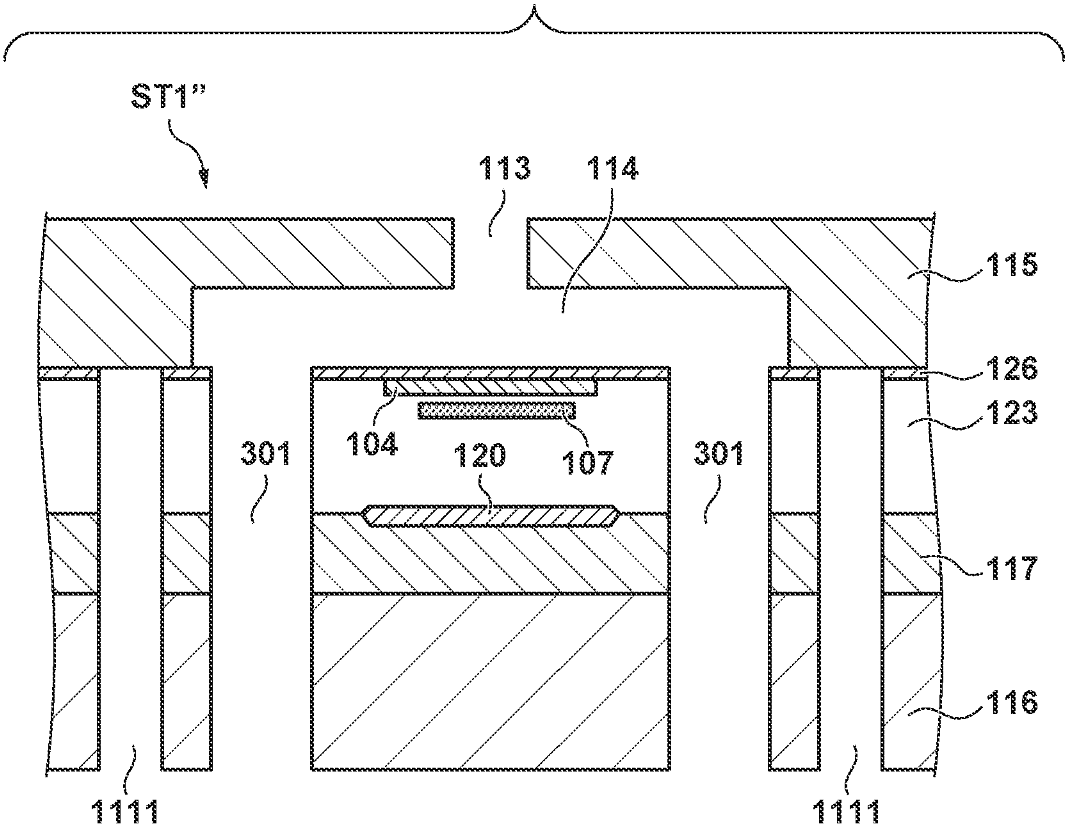
FIG. 11 is a diagram illustrating an example of another cross-sectional structure of a liquid discharging head 101.

FIG. 11 illustrates an example of a cross-sectional view of another structure ST1" of the liquid discharging head 101, similarly to FIG. 2B. In the present example, when forming the supply ports 301 with a well-known semiconductor manufacturing technique, a deep element isolation portion 1111 is formed therewith. In other words, the deep element isolation portion 1111 is formed of a groove-like cavity and is formed so as to extend through the silicon substrate 116 or the head substrate 601, which includes the silicon substrate 116, and reach the nozzle material 115.

In such a configuration, in order to ensure necessary electrical connection, such as the arrangement of the wiring 125, it is advantageous to provide the above-described separating regions 901 and 1001 (see the fourth embodiment). It is advantageous to position these separating regions on a side distal to other circuit units that may generate noise, and this makes it possible to reduce or suppress the effect of that noise even in cases where the separating regions become large.

According to the present embodiment, it is possible to omit a semiconductor manufacturing process for forming the deep element isolation portions 411 and the like, which have been illustrated in the first to fourth embodiments.

OTHER

In the embodiments, the individual elements have been named with expressions that are based on their main functions, however, the functions that have been mentioned in the embodiments may be sub-functions, and the names are not strictly limited to these expressions. In addition, it is assumed that the expressions can be replaced with similar expressions. For the same purpose, the expressions, "unit/portion" can be replaced with "tool", "component", "member", "structure", "assembly", and the like. Alternatively, these may be omitted or added.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-210200, filed on Dec. 27, 2022, which is hereby incorporated by reference herein in its entirety.

What is claimed is:

1. A head substrate provided on a liquid discharging head, comprising:

an electrothermal conversion element configured to generate heat for causing liquid to be discharged;

one or more first switch elements configured to drive the electrothermal conversion element;

a temperature detection element configured to detect a temperature of the electrothermal conversion element; and one or more second switch elements configured to control the temperature detection element, wherein a well layer that forms the first switch elements and a well layer that forms the second switch elements are electrically isolated by a deep element isolation portion formed to be deeper than the well layers.

2. The head substrate according to claim 1, wherein in a plan view, the deep element isolation portion is formed so as to surround the second switch elements.

3. The head substrate according to claim 2, wherein in a plan view, the deep element isolation portion is formed in a shape of a continuous ring.

4. The head substrate according to claim 2, wherein in a plan view, the deep element isolation portion is formed so as to surround the second switch elements and be partially separated.

5. The head substrate according to claim 1, wherein the deep element isolation portion is configured by an insulation member.

6. The head substrate according to claim 1, wherein the deep element isolation portion is configured by a groove-like cavity.

7. The head substrate according to claim 6, wherein the electrothermal conversion element, the first switch elements, the temperature detection element, and the second switch elements are formed on a semiconductor substrate, and the cavity, which is the deep element isolation portion, is provided so as to extend through the semiconductor substrate.

8. The head substrate according to claim 1, wherein a power supply voltage that is supplied to the electrothermal conversion element and the first switch elements and a power supply voltage that is supplied to the temperature detection element and the second switch elements are electrically isolated from each other.

9. The head substrate according to claim 8, wherein the power supply voltage that is supplied to the electrothermal conversion element and the first switch elements and the power supply voltage that is supplied to the temperature detection element and the second switch elements are the same voltages.

10. The head substrate according to claim 8, wherein a ground voltage that is supplied to the electrothermal conversion element and the first switch elements and a ground voltage that is supplied to the temperature detection element and the second switch elements are electrically isolated from each other.

11. The head substrate according to claim 2, further comprising:

a circuit unit configured to receive a signal from the temperature detection element via the second switch elements and process the signal, wherein the circuit unit includes a differential amplifier circuit and a filter circuit, and in a plan view, the deep element isolation portion further surrounds the differential amplifier circuit and the filter circuit.

12. A liquid discharging head comprising:

the head substrate according to claim 1; and a discharging port for discharging liquid.

13. A liquid discharging device comprising:

the liquid discharging head according to claim 12; and a feeding mechanism configured to convey a printing medium.

* * * * *